May 20, 1924.
H. W. LORMOR
1,494,436
CLAMP FOR USE IN COATING BATTERY BOXES AND THE LIKE
Filed Sept. 12, 1921    2 Sheets-Sheet 2
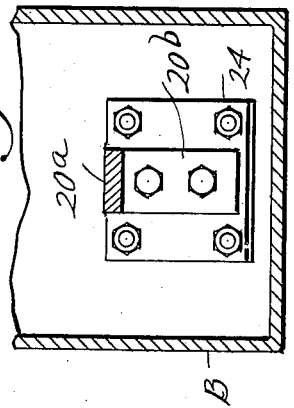
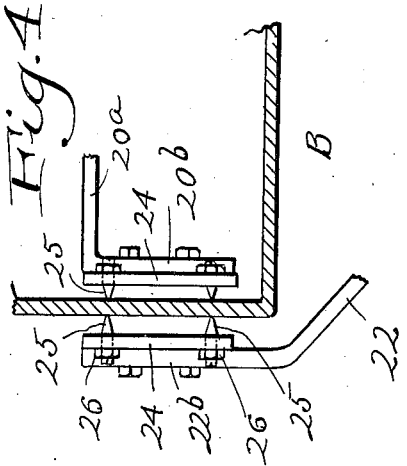
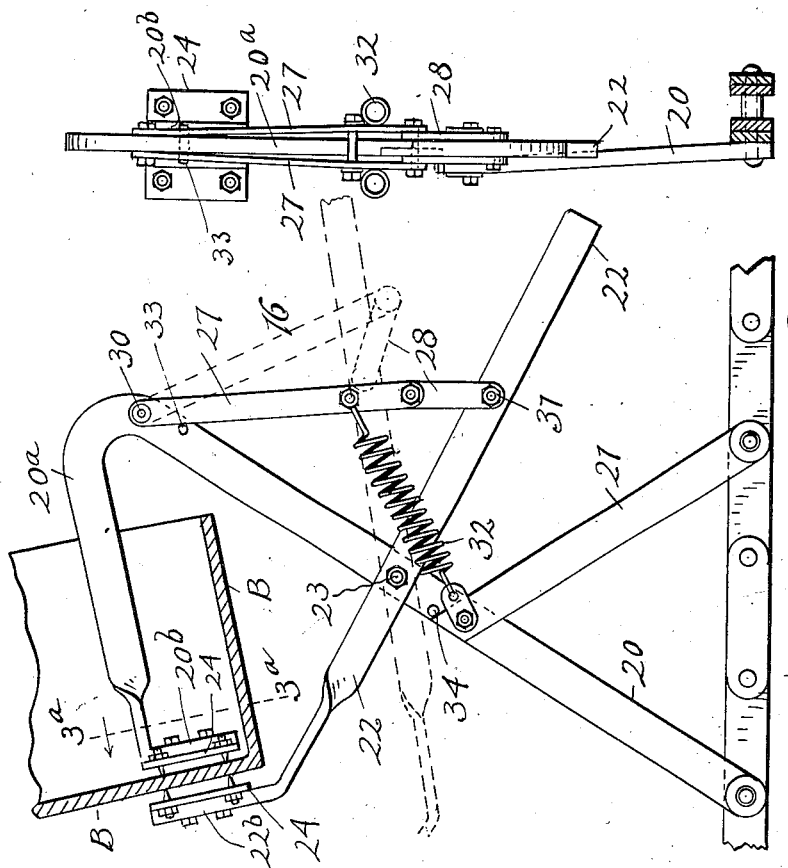

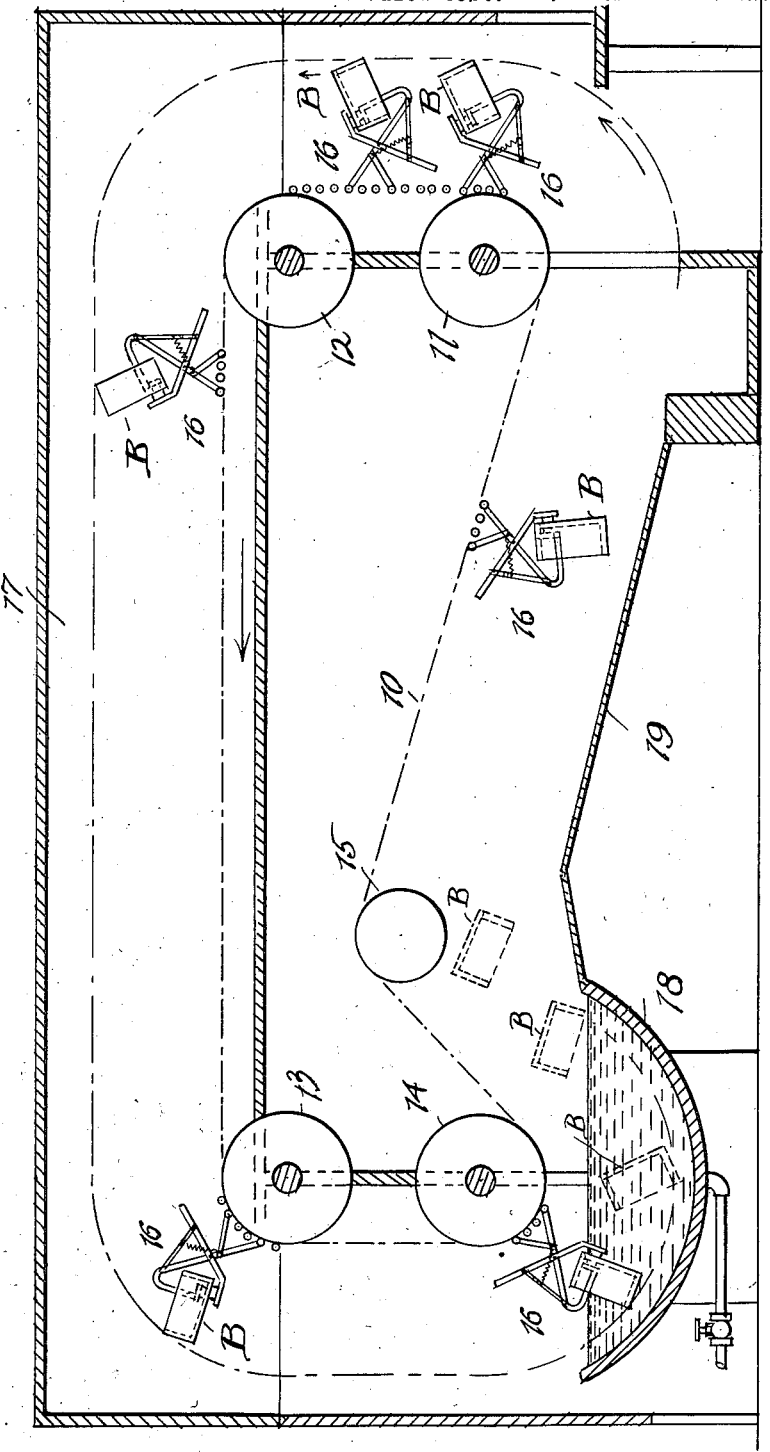

Patented May 20, 1924.

1,494,436

UNITED STATES PATENT OFFICE.

HENRY W. LORMOR, OF CLEVELAND HEIGHTS, OHIO, ASSIGNOR TO WILLARD STORAGE BATTERY COMPANY, OF CLEVELAND, OHIO, A CORPORATION OF WEST VIRGINIA.

CLAMP FOR USE IN COATING BATTERY BOXES AND THE LIKE.

Application filed September 12, 1921. Serial No. 499,991.

*To all whom it may concern:*

Be it known that I, HENRY W. LORMOR, a citizen of the United States, residing at Cleveland Heights, in the county of Cuyahoga and State of Ohio, have invented a certain new and useful Improvement in Clamps for Use in Coating Battery Boxes and the like, of which the following is a full, clear, and exact description.

This invention relates to certain improvements in a clamp or holder to clamp and support a receptacle such as a wooden battery box while it is being dipped in a painting or coating solution and is being conveyed to and from the solution.

The principal object of the invention is to provide a clamp which will engage the box on the inside and outside of the bottom only, and will not engage any other part or surface of the box so as to mar the coating which is applied to the box.

Further the invention aims to provide a box clamp or holder of such a nature that it will properly support the box as it is being conveyed into, through and out of the solution, so that the box is properly coated all over its surface, inside and out, and excess solution will drip in a most advantageous manner from the box after it has left the solution.

The invention may be briefly summarized as consisting in certain novel details of construction, and combinations and arrangements of parts which will be described in the specification and set forth in the appended claims.

In the accompanying sheets of drawings, Fig. 1 shows somewhat conventionally a dipping and drying device with which holders or clamps constructed in accordance with my invention may be used advantageously; Fig. 2 is an enlarged side view of one of the clamps showing by full lines the jaws in holding position, and by dotted lines in releasing position; Fig. 3 is an edge view of the same; Fig. 3ª is a section along the line 3ª—3ª of Fig. 2; and Fig. 4 is a detail sectional view through the clamping parts.

As my invention relates particularly to the clamp or holder, it is adaptable for movable supports of various types, so that the invention is not confined to the conveying member or movable part which carries the clamps, nor the particular path of movement through which the clamps and box supported thereby are conveyed, as illustrated in Fig. 1, but Fig. 1 illustrates one of the different conveyors or clamp carriers which may be utilized.

In Fig. 1 the clamps made in accordance with my invention are secured to an endless conveyor chain 10, which travels about sprockets 11, 12, 13, 14 and 15. To the links of this chain, clamps designated as a whole by the reference character 16 are attached in any suitable manner. It is not essential that the clamps be attached directly to the links of the chain for sometimes it is desirable that the boxes be carried through the solution in multiple, in which event there will be a plurality of rows or series of the clamps which could be attached to bars extending across two or more chains 10.

In the embodiment shown, the clamps are loaded, i. e., provided with the boxes to be dipped at the right hand end of Fig. 1, then are carried upwardly, then horizontally through a chamber 17 which may be a preheating chamber, then downwardly along the left hand side of the figure, and then as the clamps and the boxes supported thereby pass about the sprocket 14, the boxes are carried through a dipping receptacle 18 containing the solution which is to be applied to the boxes. It will be noted by the several views of the boxes, that as they enter the solution, they pass completely under its surface in a manner such that all the air is excluded from the receptacle. Likewise it will be observed that they leave the surface in a manner such that the solution will all run out of the interior of the boxes, and in a manner such that excess solution is dragged by the resistance of the solution from the boxes, and as they finally emerge from the solution the boxes are inclined with reference to the surface of the solution and are carried away from the receptacle 18 in such a way that all excess solution will readily drip from one edge or corner of the boxes. The best draining effects are obtained by causing the boxes to be so clamped that the drip will take place from one corner.

After the boxes leave the solution they are carried downwardly and laterally over a drip board 19, and finally reach the unloading and loading point, the boxes being preferably dry when they are removed from the clamps, a cooling blast of air being preferably directed onto the boxes as they travel from the solution to the unloading point.

Referring now to the clamp constituting the subject matter of my invention, it will be observed that the clamp comprises a bar 20 which is secured at one end to the clamp carrier, and when the latter is horizontal and is carrying the boxes toward the dipping solution, this arm projects diagonally upward from the carrier, as shown in Fig. 2. The portion of the bar remote from the end which is attached to the carrier and here designated 20$^a$, is bent at an acute angle to the body portion of the bar, which is designed to be extended into the box B. If desired, the bar 20 may be braced by an arm or strut 21 which is illustrated in Fig. 2, though in some instances the supporting member 21 is not essential.

The clamp includes also a second clamping arm 22 which is pivoted at 23 at a suitable point between the point of attachment to the clamp carrier and the point at which the curved or bent portion 20$^a$ extends from the straight part of the arm.

The operating ends of the clamp arms 20 and 22 are bent as shown at 20$^b$ and 22$^b$, these portions being in parallelism, or substantial parallelism when the arms are in clamping position. Secured to the portions 20$^b$ and 22$^b$ of the two clamping arms are two plates 24, each provided with a series of pointed box engaging devices in the form of screws 25, which may be adjusted in the plates 24 and then locked in proper position by locking nuts 26. The points of these screws are adapted to sink a short distance into the bottom of the box, the set carried by the clamping arm 20 engaging the inner surface of the bottom, and the set carried by the clamping arm 22 engaging the outer surface of the bottom. It is to be noted that no other part of the box is engaged by any part of the clamp, so that the inner and outer surfaces of all sides of the box except the small points engaged by the points of the clamping screws 25 may be coated with the solution.

It is desirable that the two jaws of the clamp be readily moved to and from clamping position, and that they be held positively in either position, and it is desirable also, that the movement be fairly rapid. For that purpose I interconnect the two clamping arms by links, and provide a holding spring which acts thereon, and in this instance the two clamping arms are connected by a pair of comparatively long links 27 and by a pair of comparatively short links 28 pivotally connected together at 29. The long links are pivotally connected at 30 to opposite sides of the arm 20 of the clamp near the junction of the straight portion with the portion 20$^a$ and the short links 28 are pivoted at 31 to opposite sides of the clamp 22, the free end of which is extended a suitable distance beyond the pivot point 30 to serve as a lever arm which can be manipulated by the operator to open and close the clamp. Additionally the long links 27 are connected to the arm 20 by a pair of tension springs 32, the function of which is to hold the links 27 and 28 in substantial alignment with the arms in clamping position, in which event the long links engage stop pins 33 carried by the arm 20. Likewise the function of these springs 32 is to hold the links 27 and 28 in broken position with the clamping portions of the arms spread apart as indicated by the dotted line positions of the links and clamping arm 22, in which event the arm 22 bears against a stop pin or abutment 34 carried by the arm 20.

It will be observed that the construction is such that when the lever arm or free end of clamp 22 is moved from the full line position toward the dotted line position, the links 27 and 28 are broken, and are moved out of substantial alignment, at which time the springs 32 are elongated somewhat, and as soon as the links make less than an angle of 90° the pull of the springs automatically moves the clamping arm 22 to full open position indicated by the dotted lines, and the springs then hold this arm in that position. Likewise, when it is desired to load the clamp with a box, i, e., to move the clamping arm 22 to clamping position, the operator swings the free end of arm 22 for a distance, and when the links 27 and 28 are moved to a position such that they make slightly more than an angle of 90°, the springs automatically from this point move the arm 22 to clamping position and then serve to hold the box clamped between the jaws of the clamp.

Having described my invention, I claim:

1. In a device for coating receptacles, a clamp carrier provided with a clamp for holding a receptacle to be coated, and comprising two arms, one adapted to be extended into the open end of the receptacle, and both arms having clamping portions adapted to engage opposite sides of a wall of the receptacle without engaging the other walls thereof.

2. In a device for coating receptacles, a carrier, a clamp carried by the carrier and composed of two arms, one pivoted on the other, and one having a bent portion adapted to extend in to the open end of the receptacle without engaging the top or side walls thereof, and both having portions adapted to engage opposite sides of the bottom of the receptacle.

3. In a device for coating receptacles, a carrier, a clamp composed of two clamping arms pivotally connected and having parts adapted to engage the opposite surface of one wall of the receptacle without engaging the other walls thereof, and means connected to both arms for holding them in clamping position, one of said arms being attached to the carrier and supporting the other arm.

4. In a device for coating receptacles, a carrier, a clamp composed of two clamping arms pivotally connected and having parts adapted to engage the opposite surface of one portion of the receptacle, and means connected to both arms for automatically holding them in either closed or clamping position, or open position.

5. In a device for coating receptacles, a carrier, a clamp composed of two clamping arms pivotally connected and having parts adapted to engage the opposite surface of one portion of the receptacle, and means comprising a pair of links connected to both arms, and a spring for holding the clamps in their closed or open positions.

6. In a device for coating receptacles, a carrier, a clamp carried by the carrier and comprising an arm secured to the carrier, a second arm pivoted thereto, one of said arms having a portion extending from the body thereof so that it may project into the open end of the receptacle, and having a portion adapted to serve as a lever to swing the same, a pair of links pivoted together and pivoted respectively to the two arms, and a spring extending from one of the links to the first-named arm and serving to hold the arms in clamping or closed position and in open position, both arms having portions adapted to engage opposite surfaces of one portion of the receptacle.

In testimony whereof, I hereunto affix my signature.

HENRY W. LORMOR.